Patented Jan. 10, 1939

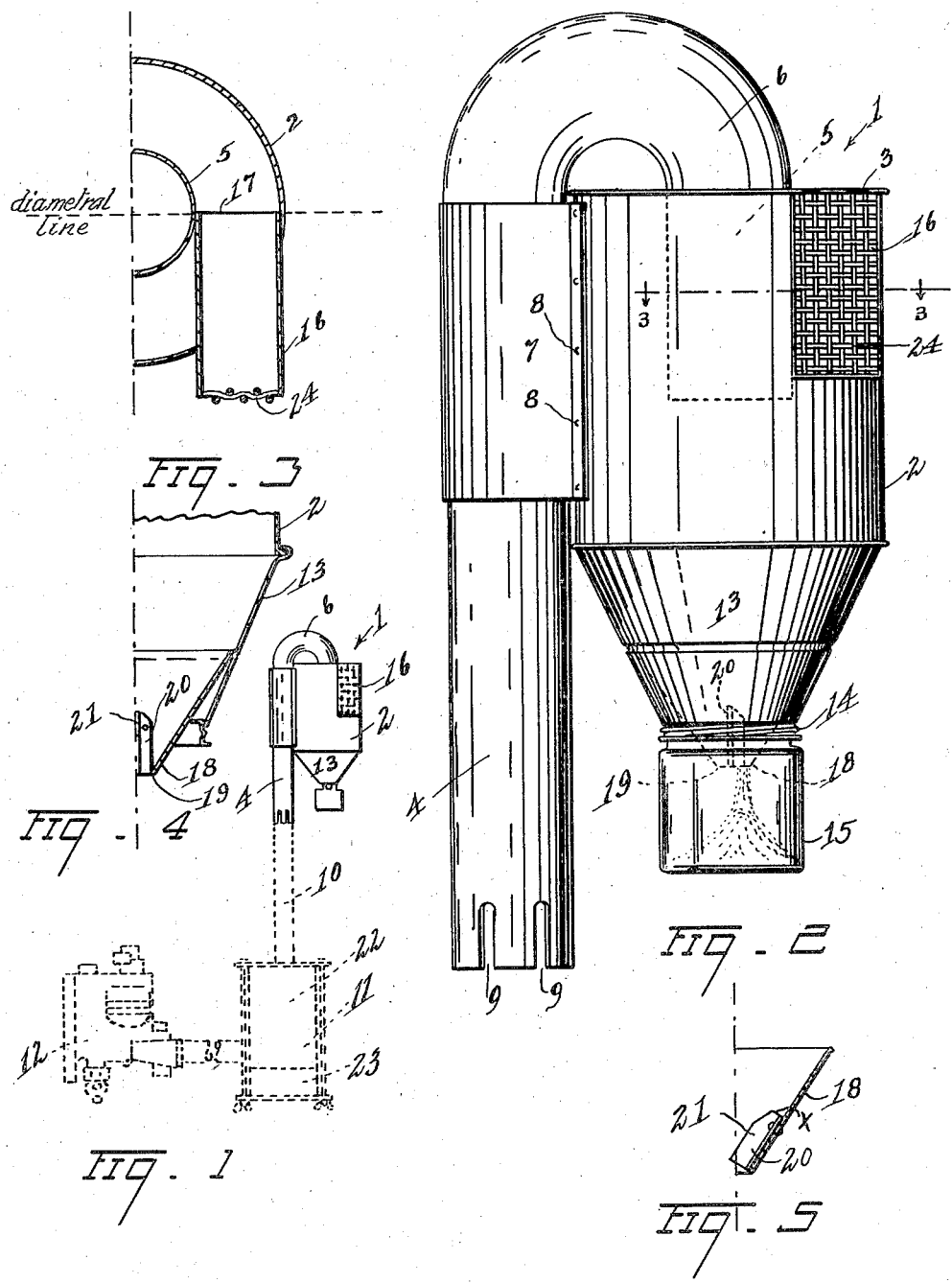

2,143,421

UNITED STATES PATENT OFFICE 2,143,421

AIR CLEANER

Claude E. Loehr and Jacob H. Hill,
Walla Walla, Wash.

Application September 7, 1937, Serial No. 162,594

1 Claim. (Cl. 183—89)

This invention relates to air cleaners, of the cyclone dust collector type and is preferably adapted for use ahead of a main oil, or other filter, to prevent clogging that member and to remove the impurities that would interfere with its proper functioning, and for that purpose will be termed in these specifications an air cleaner.

The air cleaner is more particularly adapted for use to clean the air supply of an internal combustion engine and while it has been primarily designed for that purpose it must be understood that its use is not restricted alone to this purpose but to any use to which it may be applicable.

Among the objects of the invention is to provide an air cleaner that will remove the foreign matter from air, gas or the like, more particularly having abrasive content, from dust laden air to be used in the fuel of an internal combustion engine, and in addition to minimize the accumulation that normally takes place in the usual main filter, thereby providing protection against wear of mechanical parts and to maintain a normal passageway for the air travel to the carburetor and engine that would otherwise become impaired by the clogging of the main filter with a resultant loss of power.

Another object of the invention is to provide a cleaner that by pre-cleaning will remove the necessity of frequent changing or renewing of the filtering elements of a main filter.

A further object of the invention is to provide a cleaner that by the addition of a graduated quieting baffle will not only prevent the finer, or lighter, particles of dust returning into the cleaner to again mingle with the clean air (where turbulence is permitted to exist), due to the necessity of having an air tight transparent container already filled with air into which the solid matter must of necessity fall by gravity, but also that by its undisturbed entrance therein will provide a visible indication that the device is functioning properly with a consequent satisfaction to the user when observing the gradual and quietly settling accumulation of the residue in the transparent container removably attached to the air cleaner.

A further object of the invention is to provide a cleaner that may be installed or removed readily and that is cheap to construct and highly efficient in operation.

With these and other objects in view reference is now had to the accompanying drawing in which Fig. 1 is a diagrammatic view (in the solid lines) of a side elevation of the device showing its relation to the carburetor intake pipe, the main filter and the carburetor (respectively represented by dotted lines);

Fig. 2 is an enlarged view of a side elevation of the device;

Fig. 3 is a half transverse sectional view of the device taken on the line 3—3 of Fig. 2;

Fig. 4 is a half vertical sectional view of a fragment of the device showing the relative location of the conical frustums and the quieting baffle; and Fig. 5 is a half vertical sectional view of the quieting frustum showing a quieting baffle in side elevation.

Having reference to the drawing like numerals refer to like parts throughout the several views and the numeral 1 refers to the air cleaner as a whole and this will now be explained:

The air cleaner consists in the main of a cyclone dust separator having certain refinements added which forms the subject matter of this invention and which will be presently explained, adapting it more particularly to the purposes above referred to, and comprises a cylindrical body 2 having its upper end hermetically sealed by a head 3.

An air discharge pipe 4 is secured centrally in the head and connects with an internal and vertically disposed outlet piece 5, and by means of a return elbow 6 the pipe 4 is reversed in direction to lay alongside the said body 2 to which it is secured by a semi-cylindrical boss, represented as at 7, which boss encircles the pipe 4 and secures it rigidly to the body 2 by means of rivets, represented as at 8, or other suitable means.

The depending part of the pipe 4 is provided on its lower end with slots 9 and these are used for the purpose of removably securing the cleaner to the carburetor intake pipe 10, in the usual manner of such assembly (not shown), the carburetor intake pipe 10 connecting with a main filter 11 and from thence leading to the carburetor 12. The last three members being represented by dotted lines in Fig. 1.

The body 2 terminates at its lower end in the usual manner in an inverted conic frustum 13 the lower edge of which is preferably provided with a threaded collar, as represented at 14, or other suitable means whereby to removably receive a transparent container 15.

The dust collector is completed with an air inlet duct 16 having a solid or continuous wall leading into the body 2 tangentially through which the air is drawn by the action of the engine, in the manner well known to those skilled in the art, however this duct constitutes one of the refinements referred to and consists of a rectangular pipe whose width substantially equals the distance between the outer periphery of the internal axially positioned outlet piece and the inner periphery of the body, and of a height substantially equalling the length of the outlet piece 5.

The duct is extended horizontally into the body until its inner end registers with an imaginary diametral line of the body perpendicular to the line of the central axis of the duct, and the sides of the inner end of the duct is then joined to the outlet piece, head, and to the wall of the body respectively, to the general position as shown in Fig. 3, the bottom wall being discontinued at this point, for a purpose to be explained.

By this arrangement an unbroken path is provided between the mouth 17 of the duct and the curved path remaining between the walls of the outlet piece and the body whereby to eliminate any vortex which might otherwise be formed at this point and which would decrease the velocity of the incoming air to the detriment of the efficiency of separation of the cleaner.

However the position of the body of the duct with respect to the outlet piece and the body wall, together with the discontinued bottom wall of the duct, will tend to cause a deflection of the air downward more rapidly, as will be presently explained, in other words will form a helix of greater pitch that will substantially avoid the duct, and as the velocity of air is greatest where it leaves the duct and decreases in the zone of greatest volume (below the mouth of the entrance piece) the higher initial velocity will throw the residue against the side wall by the centrifugal force exerted, when by gravity the discontinuance of the bottom wall of the duct, and the greater pitch of the helical path the residue will more rapidly reach the restricted outlet of a quieting frustum 18 (to be explained), while the cleaned air in the zone of greatest volume will pass out of the body through the entrance piece 5 to be directed to the main filter through the pipe 10.

Another refinement consists of the above mentioned quieting frustum 18 which likewise is an inverted conic frustum and which acting in conjunction with the duct 16 in its above described position tends to provide a quieting influence on the residue therein, and this frustum 18 is secured within the inverted conic frustum 13 of the collector, in the position as indicated in Fig. 4, where it is shown as having its end of greatest diameter joined integrally in a mid-position to the wall of the first named frustum 13 and having its end of least diameter extended through the small end or apex of the first named frustum to provide a projected outlet.

The quieting frustum 18 is provided with a restricted mouth 19 adapting the mouth to enter the container 15 for the deposit of the residue therein, and is further provided with graduated quieting baffles 20 that by their tapered blades 21, secured radially and integrally within the quieting frustum with their low radial extension X positioned uppermost in the frustum and their lowermost end having greater radial extension, will gradually obstruct the circular movement of the residue with slight obstruction as the residue strikes the said low part X and with increasing obstruction at the point of exit, i. e. at the junction of the baffle with the rim of said restricted mouth 19 when all circular motion will have ceased and deposit will be made in the container by the force of gravity alone without turbulence to thus visually indicate clearly the proper functioning of the device as it discharges into the glass container.

With the baffles as shown and described it is now apparent that a free opening is left in the center of the outlet between the inner edges of the radially extended baffles thereby permitting greater freedom of egress from the outlet whereby to further influence the pitch of the helical path of the residue and further diverting the path of the fluid past the duct.

In its primary use the cleaner 1 is surmounted on the top of the carburetor intake pipe 10 which pipe leads to the main filter 11 and thence to the carburetor 12 and finally to the engine (not shown) in the well known manner.

Assuming that the main filter contains some filtering element let us assume that this filter, represented in the drawing, consists of a container divided to provide a filter chamber 22 and an oil chamber 23 connected (in a manner not shown) that air entering at the top of the filter chamber 22 must pass through the element therein and through oil in the oil chamber 23 before passing to the carburetor.

Then, (in the absence of the cleaner) any air being drawn in by the action of the engine will pass through the filtering element leaving a deposit on the element to lessen the size of the interstices therein as each succeeding suction draws in more foul air, to ultimately destroy the efficiency of the main filter.

In addition the air is refiltered as it is passed through the oil of the oil chamber 23 where a second accumulation of residue takes place.

Now, by the addition of the cleaner dust laden air is started on its way, as before explained, passing first through the screen 24 which removes the larger particles, the screen being provided with apertures whose combined area is slightly in excess of the area of the air pipe 4, the reason for which is obvious.

After passing the screen the air moves in a straight path tangent to the curvature of the wall of the body 2 and then takes up a circular motion by the force of the indrawn air.

As the air in its circular movement approaches the body of the duct 16 it is deflected downward by that member (aided by the aforementioned discontinuance of said bottom wall of the duct) in its efforts to continue its circular travel thereby increasing the pitch of the convolutions to more rapidly assist gravity to deposit the residue which, by centrifugal force has forced the foreign matter against the inner periphery of the head. In so doing it is obvious that no vortex is formed at the starting of the air on its circular travel.

With the solid matter now against the wall the remaining air, free of foreign matter, will pass through the entrance piece 5, and continuing through the elbow 6 and pipe 4 will enter the main filter 11 through the pipe 10 free of the impurities that would otherwise obstruct and clog this member, thus maintaining a high efficiency and overcoming the necessity of frequent renewals of the filtering elements in the main filter.

The impurities now fall to the body frustum 13, then to the quieting frustum 18 where, by the lesser slope of the last named frustum the pitch of the convolutions becomes less, with the result that the velocity of the residue decreases at which time the residue contacts the lower radially extended part of the graduated blade 21 partly stopping its movement, and continuing until it reaches the higher radially extended part at the outlet 19 when its circular movement will have entirely ceased and the foreign matter will fall without turbulence to the bottom of the container.

Having thus described our invention, we claim:

An air cleaner, comprising a casing consisting of a cylindrical body member terminating at its lower end in an inverted conic frustum, and provided at its upper end with a head, an outlet pipe secured in said head and having its lower end extended downward to receive the discharge substantially centrally in the body member, a rectangular tangentially positioned inlet duct terminating at and perpendicular to the diametral axis of said body member and having its upper wall in the plane of said head and its lower wall substantially in a plane of the lower end of said outlet pipe, an inner inverted conic frustum, having its end of greatest diameter joined in a mid position to the walls of the first named conic frustum, and having its end of least diameter extended through the apex of the first named frustum to provide an outlet to a container, and a series of tapered baffles radially positioned in said outlet with the end of least radial extension disposed upward to present least interference in the path of the residue and the ends of greatest radial extension disposed downward for converse reasons, and to provide a free opening centrally between the inner edges of said baffles.

CLAUDE E. LOEHR.
JACOB H. HILL.